United States Patent [19]

Levin et al.

[11] Patent Number: 5,402,834
[45] Date of Patent: Apr. 4, 1995

[54] SOLUTION PREPARATION SYSTEM

[75] Inventors: Michael D. Levin, Franklin Park; William F. Richardson, Somerset; Alan B. Todtenkopf, Bridgewater, all of N.J.

[73] Assignee: Merck & Co., Inc., Rahway, N.J.

[21] Appl. No.: 981,456

[22] Filed: Nov. 25, 1992

[51] Int. Cl.⁶ .......................... B65B 1/30; B65B 3/26
[52] U.S. Cl. ...................... 141/83; 141/100; 141/128
[58] Field of Search .................. 141/1, 83, 100, 94, 141/128, 192; 177/122, 50; 222/50, 58, 63, 56; 417/36

[56] References Cited

U.S. PATENT DOCUMENTS

| | | | |
|---|---|---|---|
| 3,907,167 | 9/1975 | Zanardo | 222/57 |
| 4,345,628 | 8/1982 | Campbell et al. | 141/83 |
| 4,350,186 | 9/1982 | Schalkowsky et al. | 141/83 |
| 4,467,844 | 8/1984 | DiGianfilippo et al. | 141/1 |
| 4,469,146 | 9/1984 | Campbell et al. | 141/9 |
| 4,648,430 | 3/1987 | Di Gianfilippo | 141/83 |
| 4,688,610 | 8/1987 | Campbell | 141/83 |
| 4,830,508 | 5/1989 | Higuchi et al. | 222/56 |
| 5,148,841 | 9/1992 | Graffin | 141/83 |
| 5,159,959 | 11/1992 | Böhm | 141/1 |
| 5,287,896 | 2/1994 | Graffin | 141/83 |

OTHER PUBLICATIONS

Bigley et al. "Multitasking Laboratory Automation" presented at the American Association of Pharmaceutical Scientists Meeting, Las Vegas, Nev., Nov. 1990.
Bigley et al. "Laboratory Robotics at Merck and Company—A Change In Direction" presented at the American Association of Pharmaceutical Scientists Meeting, East Brunswick, N.J., between Jun. 4–6, 1989.

*Primary Examiner*—Henry J. Recla
*Assistant Examiner*—Steven O. Douglas
*Attorney, Agent, or Firm*—Frank P. Bigley; Mark R. Daniel; Joseph F. DiPrima

[57] ABSTRACT

Solutions are prepared by accurately dispensing and weighing concentrated solutions of salts, acids and bases as well as water or organic solvent, and mixing to achieve homogeneity. The final solution may be stored or used directly from the system.

5 Claims, 11 Drawing Sheets

FIG. 9 SOLUTION PREPARATION

SOLUTION PREPARATION SYSTEM

MICROFICHE APPENDIX

A copy of the computer software referred to herein is affixed immediately before the claims section of this specification and labeled as MICROFICHE APPENDIX.

FIELD OF THE INVENTION

The solution preparation system is a novel device used to accurately dispense reagents, water and organic solvents. The solutions are dispensed in a novel manner with the accuracy and precision required for sample preparation and other laboratory or industrial use. The system uses a closed loop controlled dispensing system to meter reagents, organic solvents and water to effect the desired solution with unexpectedly good accuracy and precision. Novel closed loop control software provides a means of injecting the precise amount of reagent, water or organic solvent to achieve the desired solution. An interactive menu provides a means to input the desired solution characteristics.

BACKGROUND OF THE INVENTION

Various devices have ben proposed which provide for liquid dispensing. These generally fall into three groups, volume dispensing, timed open loop dispensing or gravimetric dispensing. Among the liquid dispensing devices are automated berets such as the device disclosed in U.S. Pat. No. 3,989,169. Other devices such as syringe drive mechanisms as disclosed in U.S. Pat. No. 5,055,263 have also been used to provide for delivery of a particular liquid. Certain of these systems provides a means of mixing two different liquids in a manner which results in the dilution of one solution with the other. For example, U.S. Pat. No. 4,734,378 is directed to the use of two syringe barrels and mixing. The syringes are independently activated and dispense both liquids at a rate which produces the desired dilution.

Both of these types of systems are prone to errors introduced by the presence of air bubbles, dissolved gasses and leaks.

Liquid dispensing based upon weight has been described in U.S. Pat. No. 4,350,186. Here, liquid is delivered to a container whose weight is measured by an electronic balance which is monitored by a computer. The pump is operated at a fixed delivery rate until the desired amount of liquid is delivered to the vessel. The pump is stopped or a valve is closed when the weight of liquid in the vessel equals the amount desired. Although gravimetric systems of this type overcome the problems commonly associated with volumetric delivery, repeated calibration is usually necessary to achieve the required accuracy and delivery is often slow, hampered by the need to constantly stop and check how much liquid is still needed. Further, systems utilizing this method risk over-shooting the target amount, if there is a significant delay from the time the weight is detected until the flow is stopped.

In addition, the precision and accuracy offered by both the volumetric and previously existing gravimetric procedures often are not suitable for use in a laboratory or industrial setting where more exacting specifications are required. There is, therefore, a long felt need for a system capable of accurately and precisely preparing aqueous and organic solvent based solutions of various salts, acids and bases.

This novel solution preparation system which is herein presented has demonstrated the ability to dispense liquids rapidly, precisely and accurately using closed loop feedback control. The problems associated with other gravimetric liquid dispensing systems have been avoided by incorporating classical closed loop feed back control techniques into the mechanical design.

SUMMARY OF THE INVENTION

This invention concerns a novel device for the delivery of a liquid which comprises:

(a) means for transferring the liquid to a vessel;

(b) means for weighing the vessel and the liquid in the vessel;

(c) controller means;

(d) closed loop feedback software means;

(e) weighment electronic means for monitoring the weight and change in weight of the vessel contents; and (f) pump control electronic means for adjusting the speed at which the liquid delivery means dispenses the liquid to the vessel;

wherein, the stock solution or diluent is delivered to a vessel which is operably associated with the means for weighing the vessel along with the vessel contents, while the response from the weighing means due to the increasing weight of the added stock solution is electronically transmitted to the computer means where the closed loop feedback software means examines the balance response and the computer means generates an electronic signal which signal is transmitted by the controller to the pump control electronic means resulting in the modulation of the pump speed in order to deliver the proper weight of solution.

In addition, the device may also contain means for mixing the contents of the vessel; means for choosing between several stock solutions such as acids, bases, salts and organic solvents; means for dispensing a solution from the vessel to a holding tank; and means for rapidly adding large quantities of diluent.

BRIEF DESCRIPTION OF THE DRAWINGS

FIG. 5($a$), 5($b$) and 5($c$) show the response of the balance to a variety of step inputs.

DETAILED DESCRIPTION OF THE INVENTION

The novel apparatus of this invention is a device for the delivery of a liquid which comprises:

(a) means for transferring the liquid to a vessel;
(b) means for weighing the vessel and the liquid in the vessel;
(c) controller means;
(d) closed loop feedback software means;
(e) weighment electronic means for monitoring the weight and change in weight of the vessel contents; and
(f) pump control electronic means for adjusting the speed at which the liquid delivery means dispenses the liquid to the vessel;

wherein, the stock solution or diluent is delivered to a vessel which is operably associated with the means for weighing the vessel along with the vessel contents, while the response from the weighing means due to the increasing weight of the added stock solution is electronically transmitted to the computer means where the closed loop feedback software means examines the balance response and the computer means generates an electronic signal which signal is transmitted by the controller to the pump control electronic means resulting in the modulation of the pump speed in order to deliver the proper weight of solution.

In addition, the device may also contain means for mixing the contents of the vessel; means for choosing between several stock solutions such as acids, bases, salts and organic solvents; means for dispensing a solution from the vessel to a holding tank; and means for rapidly adding large quantities of diluent.

Figure 1:
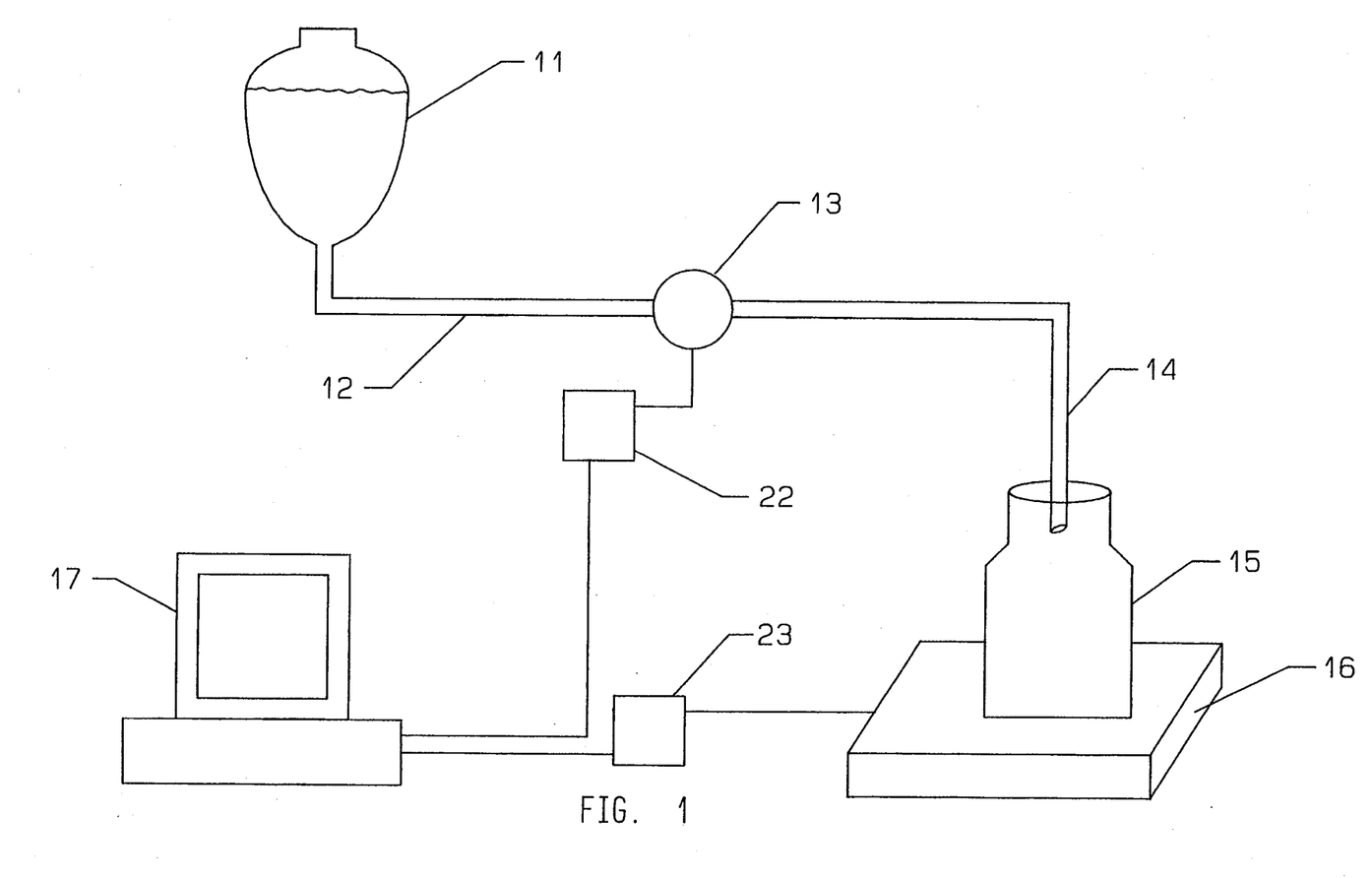
FIG. 1 is a side view of a system capable of delivering one liquid to a vessel.

This device accurately, precisely and rapidly dispenses a desired weight of liquid into a vessel. FIG 1 shows one embodiment of how this novel approach to dispensing by weight is accomplished. Here, a vessel (15) has been placed upon an electronic balance (16). The delivery nozzle (14), which leads from a pump is positioned over the vessel (15) and the weight of liquid desired is entered into the computer (17). Initially, the computer (17) receives a signal through the weighment electronic means (21) which corresponds to the mass resting on the balance (16) before any liquid has been added to the vessel (15). This is defined as the reference weight. The current weight, or the weight of liquid which has been dispensed into the vessel (15) is determined by subtracting the reference weight from the actual weight. Thus before any liquid is dispensed, the current weight is zero.

The weight of liquid desired is defined as the target weight. After the target weight of liquid has been dispensed, the current weight and the target weight are equal. Error is determined during the dispensing operation by calculating the difference between the target weight and the current weight. In the simplest expression of the system, the larger the error, the further the current weight is from the target weight and the faster the pump dispenses liquid.

During the dispensing operation, the computer (17) controls the pump (13) by producing a signal which is proportional to the current needed to generate a specific flow rate. This signal is transmitted to a pump control electronics circuit (22) where it is converted to a current which is delivered to the pump (13). The magnitude of the signal transmitted to the pump control electronics circuit (22) is determined by the closed loop feedback software which periodically calculates the difference between the target weight and the current weight and multiplies this difference by a gain. Throughout the dispensing operation, the signal generated by the balance (16) is transmitted to the computer (17) where the error and hence the output gain is recalculated. As the error approaches zero, the signal sent to the pump control electronic circuit (22) is proportionately reduced and therefore the flow rate of the pump (13) is reduced until at zero error, when the mass delivered is equal to the mass desired, the current to the pump (13) goes to zero and the pump is stopped.

Referring again to FIG. 1, the instant before the dispensing operation begins, the current weight is equal to the reference weight and the error is equal to the target weight. Once the error is determined by the computer (17), the appropriate signal is calculated by multiplying the error by a predetermined gain. The computer then transmits this signal to the pump control electronic circuit (22) where the signal is converted into a current which drives the pump and liquid moves from the liquid reservoir (11) through transmission line (12) and ultimately to the vessel (15).

From the time the first drop of liquid reaches the vessel (15), the error begins to decrease. The current weight is repeatedly updated to reflect the addition of liquid to the vessel (15). The error diminishes as the current weight approaches the final target weight. This diminishing error results in a smaller control signal being sent to the pump control electronic circuit (22) and therefore the pump (13) responds at a slower flow rate as the target weight is approached. When the error is within a predetermined range, defined as the dead band, the control signal goes to zero and the transfer means halts the delivery of liquid to the vessel (15). At this point, the weight of solvent which has been delivered to the vessel (15) is within predefined tolerance limits. That is the tolerance limits are adaptable to the particular situation.

The closed loop dispensing system of this devices uses both a proportional and an intergral algorithm. At larger errors, that is those above a predefined threshold, the system is a pure proportional controller. At error levels within this threshold, the error is repeatedly summed with each subsequent sampling interval, multiplied by a gain, and added to the flow rate determined by the porportional gain. This integral term is important because the pump will not respond to flowrate commands below a certain value due to bearing friction, inertia and other nonlinear factors. This integral term will boost the command until the pump starts, thus eliminating small steady state errors.

Figure 2:
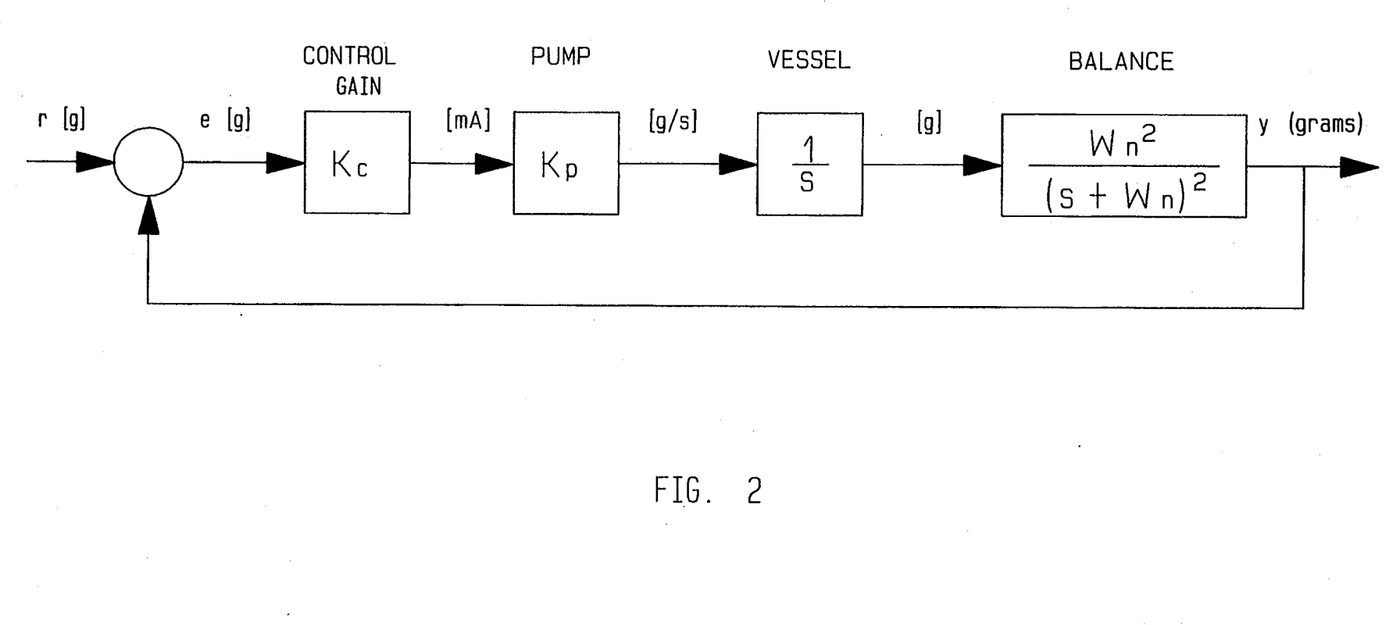
FIG. 2 is a block diagram of the closed loop system used to dispense a weight of liquid.

FIG. 2 is a block diagram of a closed loop system that dispenses a weight of liquid. Note that a volume request would be satisfied by multiplying the desired weight by the appropriate specific gravity before issuing the request to the system. The block diagram is a mathematical abstraction of the real system and is used to pick the control gain, Kc, which gives the desired closed loop characteristics for the system.

The input to the closed loop system is called the "reference signal", r. The signals may be analog but preferentially are digital information transferred through a computer. In this system, the reference has units of grams. The most currently available measurement from the balance, which is not necessarily stable, is subtracted from the reference to provide an "error signal", e. It should be noted that when the measurement is equal to the reference, the error is null and nothing drives the system. That is, as previously stated, when the desired weight is reached, the input to the pump is zero. It should also be noted that this approach utilizes linear system theory, thus for example, signals can be positive as well as negative and there is no limit to the pump or balance outputs. Since the actual system does not meet this criteria, linear system theory is used to design the control law, and the effects of nonlinearity are simulated to more accurately evaluate and modify the design.

The error signal gets multiplied by the control gain, Kc, which has units of milliamps/gram. The computer sends this signal in milliamps, to the pump and the pump responds with different flow rates according to the empirically determined constant Kp which is in grams/-second/milliamp.

The flow rate gain is calculated to produce the ideal flow rate that will deliver the liquid as fast as possible, without over shooting the endpoint. This is determined empirically by testing the flow characteristics of the transfer means, and more importantly the dynamic characteristics of the balance. By flow characteristics is meant that the weight of liquid dispensed over time is measured against various pump input currents.

In the instance device, the critically damped gain has been chosen to represent the theoretical best value for gain. This is determined through the use of classical control theory. The value chosen for this system is 0.778, which is the theoretical value for a continuous time, linear system. (See *Feedback Control* System Analysis and Syntheses, John J. D'Azzo, Constantine H. Houpas. McGraw-Hill, 2nd Ed. 1966, Chapter 3, pp 59-85.)

As previously stated, this theoretical gain is multiplied by the error to generate the theoretical best control signal which determines the theoretical flow rate. However, different transfer means, transmission lines and back pressures result in the production of inherent errors in the theoretical gain which must be taken into account. These corrections are accounted for when the flow rate versus pump input current data is obtained, since from this experimental data, the control gain which is in milli-Amps per gram can be determined.

The pump has a maximum flow rate at which it is capable of delivering liquid, therefore there is a finite limit to the current which when applied will result in increased flow of liquid. The closed loop feedback software is designed to recognize this condition. When the output amperage is calculated, the software checks to assure that it is within the operating range of the pump. Should the calculated amperage exceed the useful maximum, output is truncated back to the maximum useable value.

An empirically determined correction factor may also be included within the determination of the flow rate gain. In a series of automated experiments, the pump flow rate is determined at various applied current values, and a non-zero intercept is determined. That is, there is a lower current threshold below which the pump will not operate. Again, the closed loop feedback software is designed to recognize this situation and the gain is adjusted to compensate. This compensation also corrects for minor changes in the integrity of the pump which might otherwise lead to over shooting or the addition of more liquid than desired.

The relationship between the pump flow rate and applied current is critical to the operation of this embodiment of the invention. Therefore, control software has been developed that allows for the empirical determination of the gain as often as desired. In use, this software causes the pump control software to generate a series of currents which are sustained for a given amount of time. Once a particular current is applied to the pump, the weight of solvent delivered to the balance, for a given time, is determined. The current is then increased or decreased until several sets of data have been collected.

Figure 3:
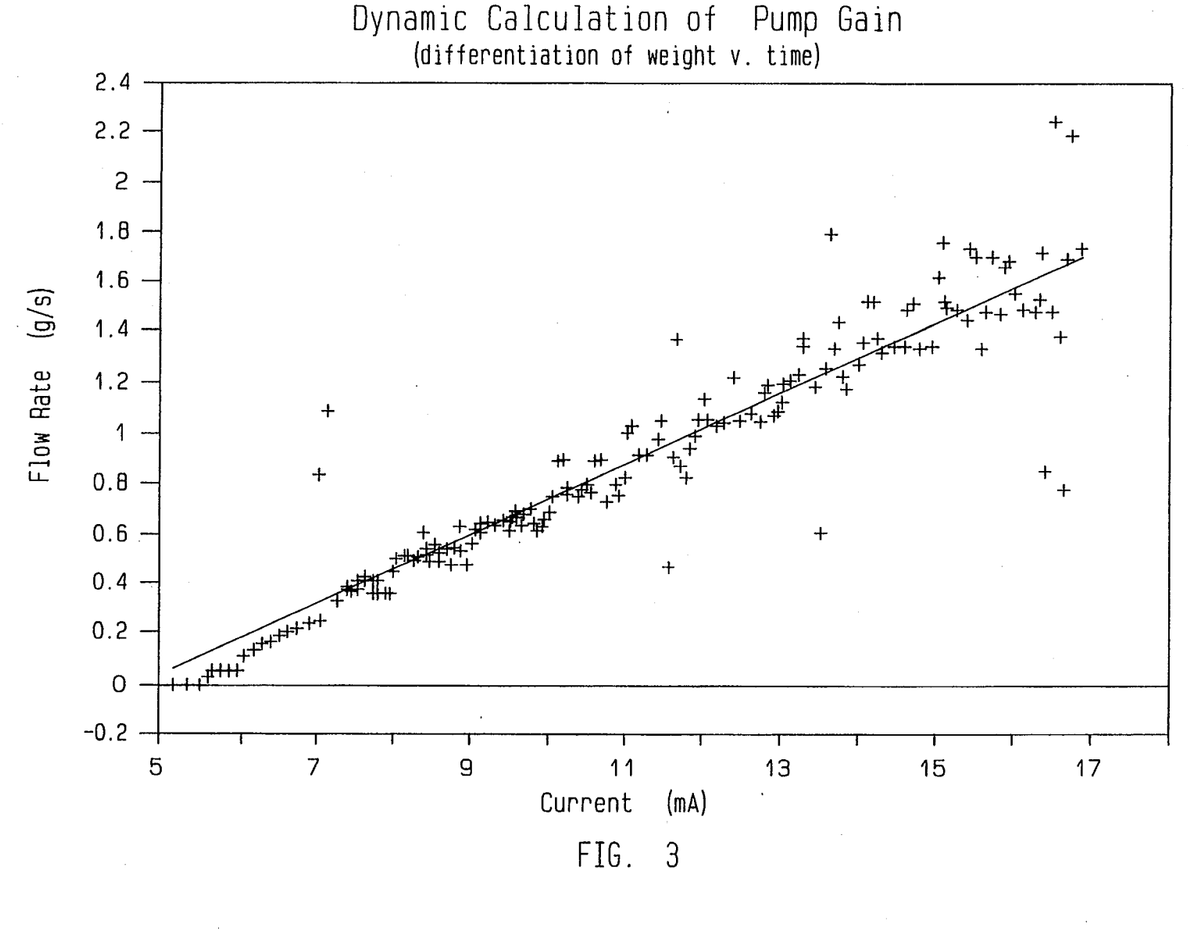
FIG. 3 is a graph which plots the flow rate in grams per second against the electric input current in order to arrive at a dynamic calculation of pump gain.
Figure 4:
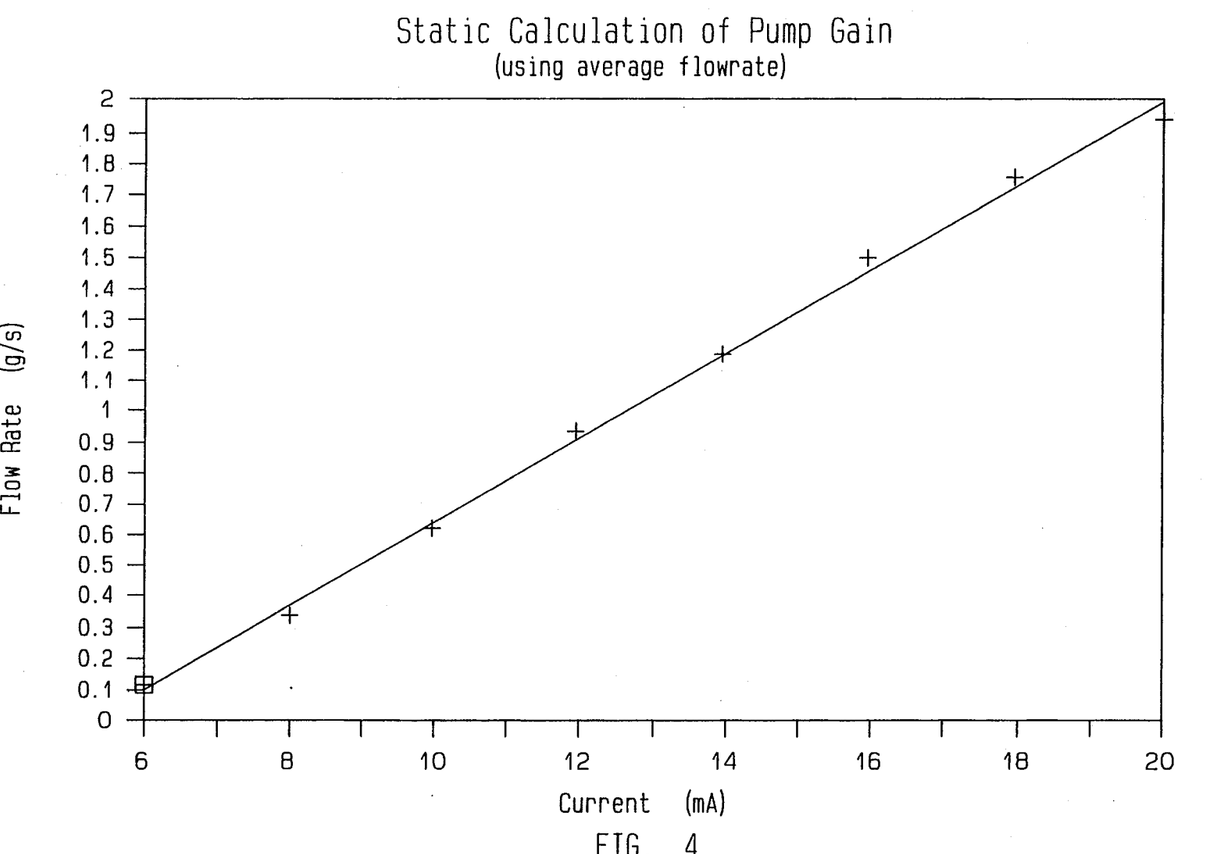
FIG. 4 is a graph which plots the flow rate in grams per second againt the electric input current in order to arrive at a static calculation of pump gain.

Once the pump flow rate response is determined for each of the applied currents, a constant can be calculated using linear regression analysis which has the units grams/second/milliamps. FIGS. 3 and 4 show the empirical data from which this constant was calculated during a typical calibration run. In FIG. 3, readings were taken from the balance every 0.22 seconds and an approximation for the dynamic flow rate was obtained by dividing the change in weight by the change in time. This data was collected as the pump was given a ramp input. In FIG. 4, the pump was run for a fixed amount of time at different input amperages and the weight dispensed for each interval was recorded. In this way, the average flow rate at several discrete values of the input current was obtained. In both cases, the relationship between input current and the output flow rate was linear within the operating range and a least squares fit provided the slope which was the constant in terms of grams/second/milliamp. This term then became a correction factor which produces the ultimate control amperage applied to the pump.

The vessel acts to integrate the mass flow rate of the pump over time to obtain a mass of liquid. This mass is weighed by the balance to provide the output, y which is in grams. The differential operator, with respect to time, is represented in the frequency domain by the Laplace transform as the operator, "s". Therefore, integration is represented by division by s. It is convenient to work in the frequency domain because the differential operator can be manipulated algebraically. For example, the differential equation describing the vessel is:

$$dy/dt = u$$

where $u$ = input flow rate
$y$ = weight
If this is transformed into the Laplace domain, it becomes:

$$sy = u$$

If the output of the vessel is y, and the input is u, a transfer function, $T = y/u$ can be calculated in the frequency domain:

$$T = y/u = 1/s$$

The motivation for representing the system components in transfer function form is that multiplying the block diagram by an input yields the output. Since one system component output is the input for the next system component, the overall transfer function relating system input to system output is obtained by cascading or multiplying the system component diagrams of the individual system components.

Figure 5:
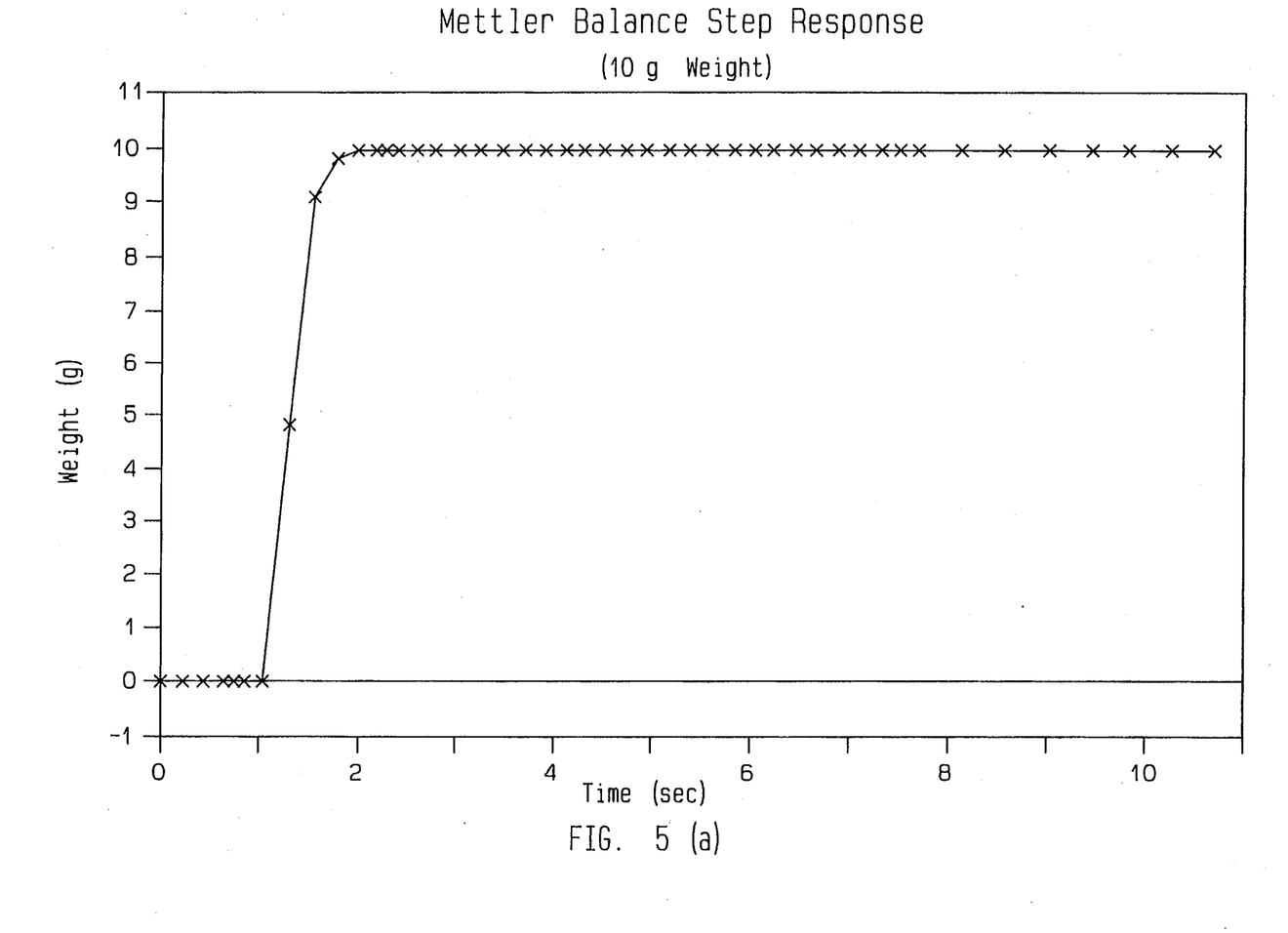

The response of the balance to a variety of step inputs is shown in FIG. 5(a), 5(b) and 5(c). The response appears to be second order and critically damped with a 98% settling time of 0.76 seconds. When the differential equation describing such a response is put into transfer function form, it appears as shown in the block diagram of FIG. 2. Note that it is the roots of the denominator of the transfer function, or poles, which determine the dynamic behavior of the system. That is, the denominator of the transfer function is the characteristic polynomial of the system. If the 98% settling time is Ts:

$Wn = 4/Ts = 4/0.76s = 5.26$ rad/s (natural frequency).

In general, the signal which drives the pump need not be limited to a constant multiplied by the difference between reference and measurement. If a faster response is desired, the derivative of the measurement can also be fed back and multiplied by a gain with appropriate units. Some closed loop systems display a steady-state error between the output and the reference. In this case, the error signal can be integrated and used to drive the pump and reduce the steady-state error. The free integrator or zero root, in this open loop transfer function, guarantees that the closed loop system with only proportional feedback (i.e. weight) will have zero steady state error to step inputs.

Figure 6:
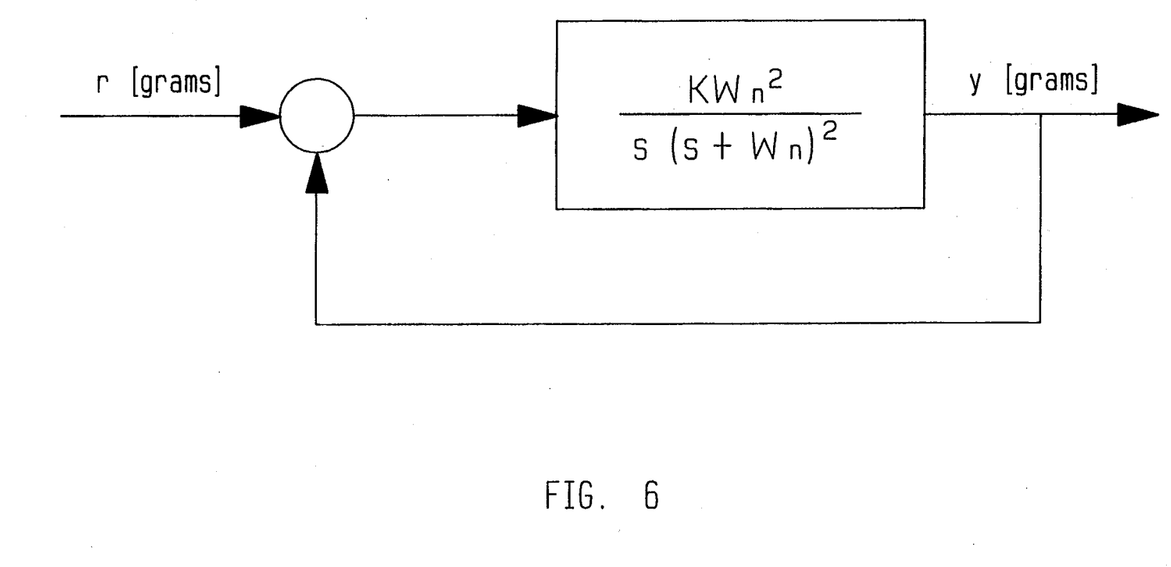
FIG. 6 is a reduced block diagram of the system, where $K = K_c K_p$.

FIG. 6, is a reduced block diagram of the system, where $K = KcKp$. If the block diagram is further reduced so that the feedback loop is eliminated, the output of the closed loop system could simply be obtained by multiplying the closed loop transfer function by the input. In general if the open loop transfer function is G, then:

$y = eG$ where e is the error signal, but, $e = r - y$ where r is the target value, such that substituting:

$y = (r - y)G$ $y(1 + G) = rG$ $y = rG/(1 + G)$ and the closed loop transfer function is $Tcl = y/r = G/(1 + G)$.

Performing algebraic manipulation on G, one obtains the closed loop transfer function:

$$Tcl = \frac{KWn^2}{s^3 + s^2 + 2Wns^2 + Wns + KWn^2}$$

where $K = KcKp$ and $Wn =$ natural frequency of 5.26 rad/s.

Since K, which can be determined by choosing Kc, appears in the denominator, the dynamics of the closed loop response can be shaped by choosing Kc appropriately. For the instant system, Kc was chosen to give the minimum, that is fastest, possible response time without any overshoot. That is, Kc is chosen so that the response is critically damped. The K which provides this behavior for the third order system is $K = 0.778$. Since the system, in theory, is linear, it will have the same dynamic response, including rise time, regardless of the magnitude of the step input. The rise time, Ts for this closed loop system is approximately three seconds.

As the above discussion demonstrates, this novel system is designed to deliver a certain weight of liquid with virtually any controller, liquid transfer means, and means for continuously weighing the vessel and the vessel contents. However, all of the values calculated above would be recalculated if the balance or pump had different characteristics.

By liquid is meant any aqueous or non-aqueous fluid and included within the term are solutions containing dissolved, suspended or dispersed solutes, mixtures of solvents and fluids, biphasic fluids, and any other material which may be pumped or pushed and which takes the shape of the container in which it is housed.

Certain liquids whose surface tension is less than that of water may tend to run out of the delivery nozzle during operation. For this reason, as the target weight of solvent is reached, the closed loop software may be designed to immediately reverse the pump for a long enough period of time to assure that additional liquid will not inadvertently reach the vessel.

By "means for transferring the solution" is meant, any pump such as a pressurizable reservoir and shut off valve combination, piston pump, syringe pump, bellows pump, displacement pump, peristaltic pump, reciprocating piston pump, centrifugal or centripetal pump, rotary vane pump, impeller device, diaphragm pump or gravity feed device. This list is meant to be illustrative of the pumps which would work acceptably with this system but is not meant to limit in any manner the type of pump which is contemplated by this invention.

The means for transferring the solution must be responsive to a control signal which causes the flow of liquid to start, increase, decrease, be maintained or stop. In the preferred embodiment, this control signal is an analog electronic signal. However, digital electronic signals or other communication means capable of controlling the means for transferring the solution are also included in this invention.

By "means for continuously weighing the vessel" is meant a balance, scale, load cell, pressure transducer or other device capable of monitoring the weight of the contents of the vessel and reporting the weight to the controller. In the preferred embodiment, this is a digital electronic balance which contains electronic circuitry capable of interacting with the controller and reporting the mass of the vessel and any content of the vessel to the controller.

By "controller means" is meant a device which is capable of accepting the signal from the means for continuously weighing the vessel, executing the closed loop feedback software and other supporting software and transmitting the needed information to the means for transferring the solution to a vessel. This may be any computer such as a multipurpose computer, single board computer, a personal computer, a microprocesor, a work station or other similar device or it may be a programmable logic controller (PLC) or an analog circuit designed for use as a controller. This list is not meant to be inclusive. Any device capable of performing the above listed functions either in combination with other devices or standing alone is within the scope of those devices contemplated for this invention.

By "closed loop feedback software" is meant the software needed to perform the operations described previously. A copy of the software utilized in this system is filed pursuant to requirements found in 35 C.F.R. 196 in the Microfiche Appendix.

By "weighment electronic means" is meant the electronic circuit required to receive and convert the electronic signal from the means for continuously weighing the vessel and transmitting this converted signal to the controller where it is processed by the closed loop feedback software. Electronic circuits capable of performing this function are often designed into modern electronic balances. For example, the Mettler AT series balances contain an RS232 port capable of transmitting the needed information from the balance to the controller using this serial communications port. (Mettler Instrument Corporation, Hightstown, N.J.) Other electronic balances, including for example, top loading balances, that have a means of communicating the weight detected to the weighment electronic means and ultimately to the controller are included within the scope of Applicants device. Further, any other conversion device, capable of sending the signal from the balance to the controller would be within the scope of this invention.

Figure 7:
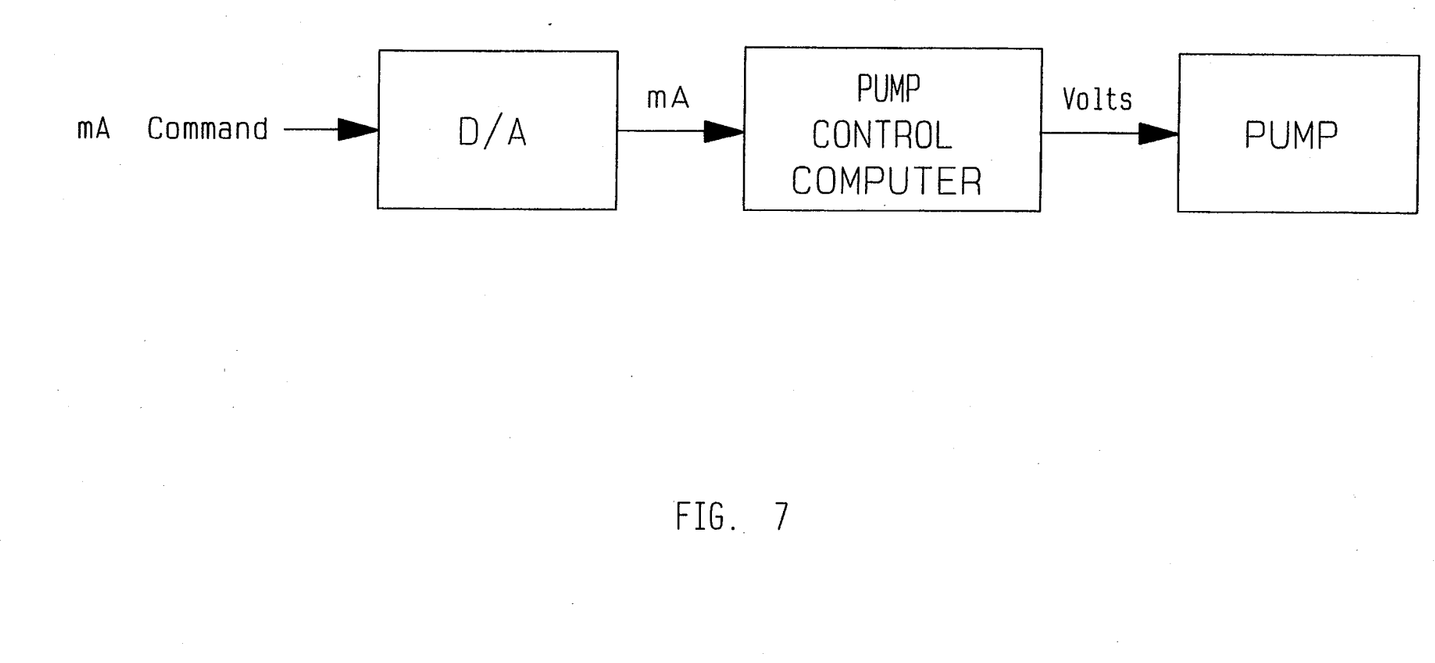
FIG. 7 is a block diagram which shows an illustrative example of the pump control electronic means.

By "pump control electronic means" is meant the electronic circuit which receives a signal from the controller, which signal was first determined by the closed loop feedback software. The signal from the controller is converted into an applied current by the control electronic means for adjusting the speed at which the liquid delivery means dispenses the liquid. An illustrative example of the type of control electronic means which is included within the scope of this invention is shown in FIG. 7. The pump control electronics converts the digital control signal from the controller into an analog signal using a digital to analog convertor. This milliampere signal drives the pump control amplifier to generate a voltage signal proportional to the input. This variable voltage signal goes directly to the pump, and determines its speed and flow rate.

Figure 8:
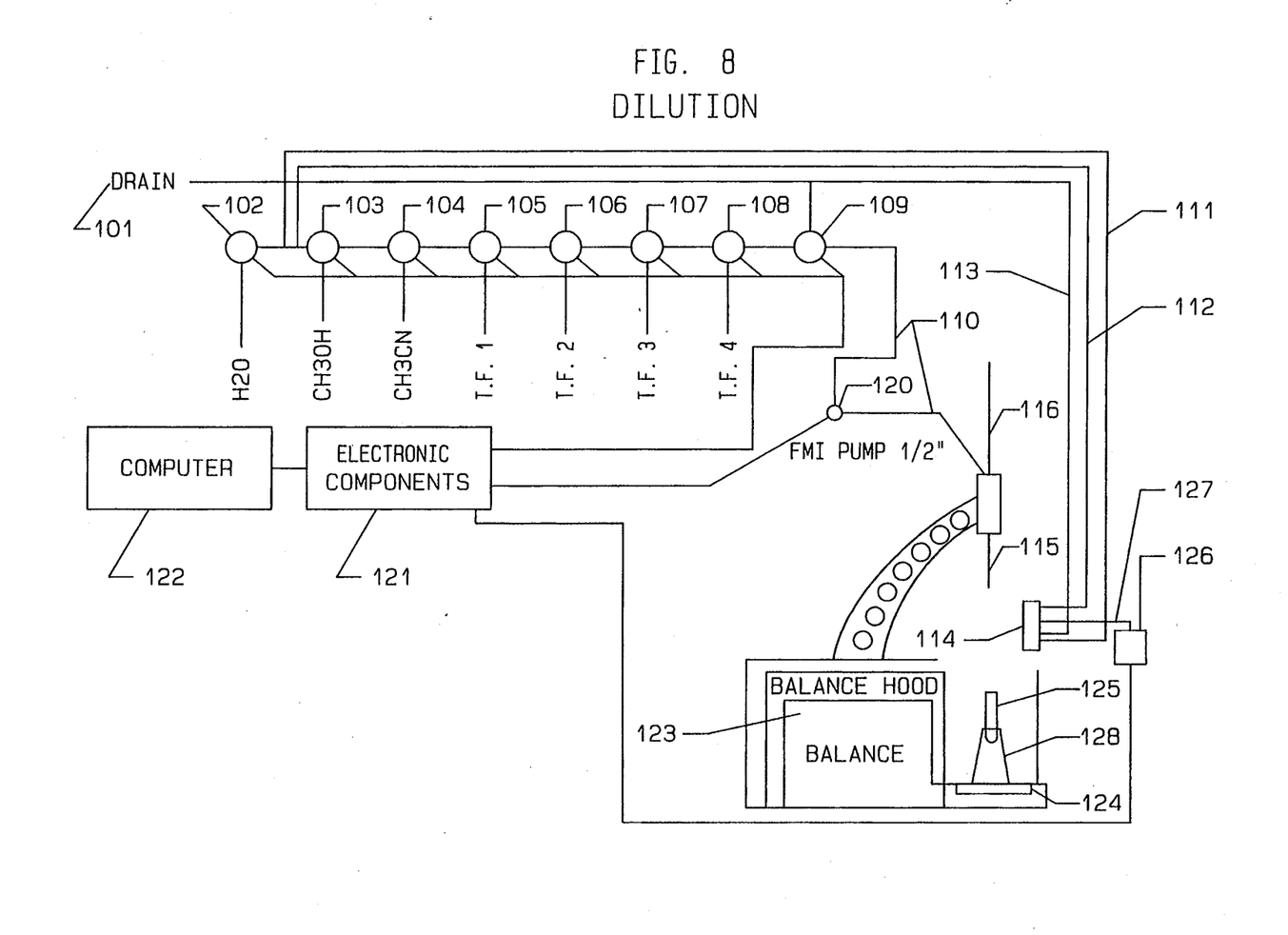
FIG. 8 shows, diagrammatically, a system capable of dispensing any one of several different liquids.

In another embodiment of this novel device, shown diagrammatically in FIG. 8, any one of several different liquids (102–109) may be selected and dispensed into the vessel so that solutions of various compositions can be prepared. The device depicted in FIG. 9, has a plurality of liquid storage containers (31–46) capable of holding different stock solutions of acids, bases, salts, organic solutions and any other solution which can be pumped as a liquid into the mixing tank (50) by pump (61) on command from controller (70).

Figure 9:
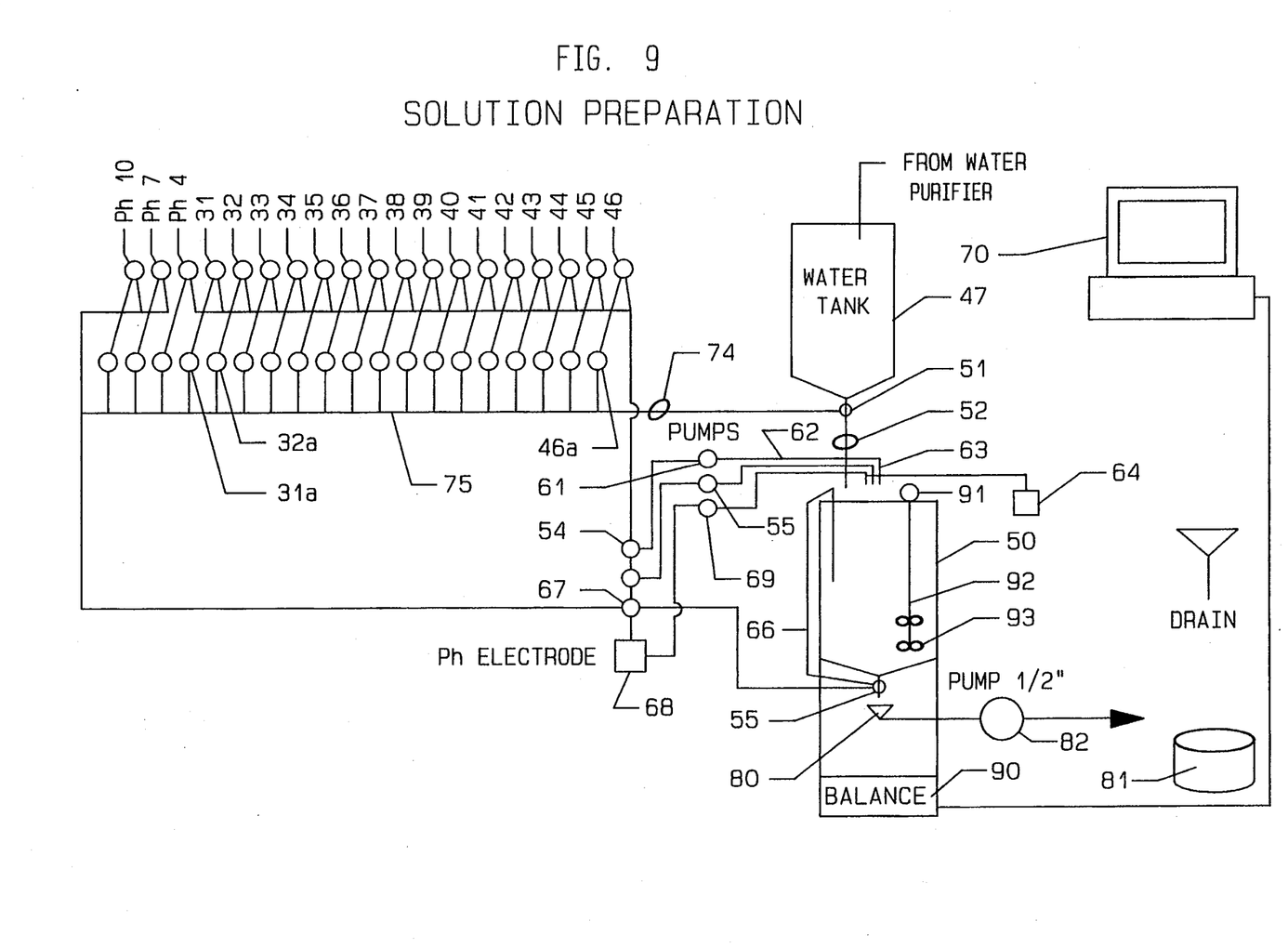
FIG. 9 shows, diagrammatically, a system capable of dispensing small masses of liquids.

Water tank (47) is supported directly above the mixing tank (50) so that when three way valve (51) is positioned for flow from the water tank (47) to go to on-off valve (52), water can be quickly added to mixing tank (50) by opening and closing valve (52). In this manner, a mass of water may quickly be added to the mixing tank (50). When smaller quantities of water are required, three way valve (51) is turned to divert the water from the water tank (47) to valve (74). When valve (74) is opened, water may be delivered to mixing tank (50) using pump (61).

Water from water tank (47) can also be diverted through the valve manifold (75) to effect a rinse after delivery of a liquid from one of the storage containers (31–46). Water or one of the liquids from the storage containers (31–46) may be used to purge the pump (61) and pump transmission line (62) by diverting the delivery nozzle (63) away from the mixing tank (50) and towards a waste receptacle (64). Once purged, pump (61) and pump transmission line (62) may be used to deliver a different liquid without fear of contamination.

The mixing tank (50) may be fitted with a four way valve (55) at its lower most end. The valve is normally in the closed position when liquids are being added to mixing tank (50) or when mixing is in progress. In one opened position, the four way valve (55) allows liquid to be dispensed from the mixing tank (50) through a funnel (80) and pumped to a holding tank (81) using pump (82). In another opened position, the four way valve (55) allows liquid to be pumped using pump (55) and recirculated to the mixing tank (50) through transmission line (66). During the recirculating operation, valve (67) may divert the liquid through the flow through pH meter (68) such that it may be pumped back into the mixing tank (50) using pump (69). This operation allows for the monitoring of pH throughout the solution preparation cycle.

Mixing tank (50) is supported on balance (90) which is electronically connected to controller (70) so that the weight of any liquid within mixing tank (50) may be reported back to the controller (70).

During operation, the concentration of absolute and the desired amount of final solution is entered into the controller (70) by an operator or the desired concentration is received from a computer or other source. The controller, in this embodiment, a computer, determines the desired liquid storage container (31–46). The total volume of solvent to be added is also determined. If the solvent is water, the controller may direct valves (51) and (52) to move to a position which allows delivery of some volume of water rapidly. This is accomplished by electronically switching the valves (51) and (52) to the delivery positions and timing the release of water from the tank (47). Once the initial volume of water is added, the balance (90) reports the weight of water delivered to the controller (70) and a decision is made to either add more water, or if the amount of water in the mixing tank (50) is equal to or greater than a preset limit of the final amount of water needed, then the appropriate liquid storage container (31–46) is chosen.

When the appropriate liquid storage container (31–46) is initially chosen, the manifold (75) is filled with water. The water must be displaced from the manifold (75) by the appropriate liquid. This is accomplished by moving the nozzle (63) into the waste position and pumping the desired liquid from the liquid storage vessel (31–46) until the transfer lines (75) and (62) contain the desired liquid in a concentration equal to the concentration contained within the storage vessel (31–46). The time required to accomplish this purging operation is determined empirically for each liquid. Once the purging operation is complete, nozzle (63) moves back into position above the mixing tank (50) and the appropriate amount of solution is added using the closed loop feedback software previously described.

Once the correct amount of solution has been added, the transmission lines are purged with water and the process is repeated until all concentrated solutions have been added. If additional water is required to dilute the solution to its final concentration, water is added through valves (51) and (74) using pump (61) under control of the closed loop feedback software.

During the dispensing operation, it is often necessary or desirable to mix the liquid in the mixing tank (50). This is accomplished in this embodiment using a laboratory mixer motor (91) to which is affixed a hollow glass shaft (92). Mixing fins (93) may be positioned at various levels along the hollow glass shaft (92). The mixing shaft is not in contact with the mixing tank (50) and therefore, when there is no liquid in the mixing tank (50) the shaft (92) does not add to the mass observed by the balance (90). However, as liquid is added to the mixing tank, the buoyancy of the shaft (92) and mixing fins (92) must be taken into account.

The buoyancy effects on the shaft (92) were determined empirically at several points. After a volume of solution had been dispensed, the initial and final weights are compared to the table containing the buoyancy effects. At each of these weights, the buoyancy effect was interpolated from the empirically derived values, and substracted from the estimated weight. The difference between these compensated weights is then the actual weight.

EXAMPLES

As the above discussion and the following examples show, the novel device herein described provides for a method for dispensing a liquid using closed loop feedback software comprising the steps of:

(a) determining the error between the weight of liquid desired and the weight dispensed;

(b) calculating the flow rate gain by multiplying the factors of the critically damped gain, the empirically determined correction factor and the error; and (c) transmitting the flow rate gain to a pump control electronic means where the flow rate gain is converted to a signal which drives a means for transferring liquid;

(d) repeating the steps of (a), (b) and (c) until the error is within a predetermined range.

Three systems, which serve as working examples of the above device and method are presented. These are meant to illustrate the novel device described herein and in no way limit the scope of the invention contemplated by the inventors.

Example 1

A liquid dispensing station, shown diagrammatically in FIG. 8, capable of accurately and precisely dispensing from about 0.01 g to about 15 g of liquid is described. The device depicted in FIG. 8 has demonstrated the ability to dispense relatively small volumes of liquid into a container such as a test tube. The device drew liquid from any of several reservoir (102-109) which was pumped, using the pump (120) shown under the control of the closed loop feedback software previously described and contained within the Microfiche Attachment. Since small volumes were delivered, the balance (124) utilized has a hood (123) which covered the balance area during delivery of the liquid to shield the balance from any drafts which might hinder the weighing process. The balance hood (123) can be retracted to allow an operator or a mechanical device such as a robot access to the balance (124) so that the container (125) can be easily removed.

FIG. 9 shows eight reservoir of liquid (102-109), although there is no practical limit to the number of reservoir which can be incorporated into this device. These were connected to the dispensing tip (115), through pump (120) using polyethylene tubing (110). Each reservoir had its own valve. Pump (120) was a QB/HOCKC 90 ml/min, pump from Fluid Metering Incorporated, Oyster Bay, N.Y. Dispensing tip (115) was prepared by cutting a suitable segment of stainless steel tubing the inside diameter of which may range from about 0.005 mm to about 0.5 mm. The length of the dispensing tube (115) is dictated by the range of vertical motion desired. Vertical motion was managed using an air driven cylinder from Bimba Manufacturing Co., Manee Ill. The dispensing tube (115) was lowered and raised in response to air pressure received at the air driven cylinder (116). The length of throw for the air driven cylinder (116) was dictated by the range of vertical motion desired. The length of throw usually ranged from about 0.5 inch to about 15 inches.

In this example, when the dispensing tube (115) was in its most retracted position, the dispensing tube cleaning station (114) which was connected to rotary valve (126) could swing into position and receive the dispensing tube (115). Once the dispensing tube cleaning station (114) was positioned under the dispensing tube (115), the dispensing tube (115) was lowered, using the air driven cylinder (116) so that the dispensing tube (115) was completely shrouded by the dispensing tube cleaning station (114). Once in position, rinse water or solvent was pumped to the dispensing tube cleaning station (116) through transmission lines (111) and (112) and through line (110) and out to drain (101) so that the outside and inside of the dispensing tube (115) could be effectively rinsed of the previous liquid.

Once the pump (120), transmission line (110) and the dispensing tube (115) was cleaned and loaded with the appropriate liquid, the air driven cylinder (116) reversed its stroke and the dispensing tube (115) was withdrawn from the dispensing tube cleaning station (114). At this time, the dispensing tube cleaning station (114) was rotated out of the path of the dispensing tube (115).

FIG. 8 shows a test tube (125) sitting on a test tube holder (128) which rests on the balance (124). In this example, the dispensing tube (115) was moved into position inside the top of the test tube by the air cylinder (116). Once in position, the controller, which was an IBM PC 286 computer operating the closed loop feedback software, issued a command to begin dispensing liquid. When the liquid dispensing was complete, the dispensing tube (115) was retracted.

Table 1 shows the results achieved when several different volumes of water were dispensed. Similar results were obtained when organic solvents or aqueous solutions were dispensed.

TABLE 1

| Low Volume Dispensing | | |
| --- | --- | --- |
| Target Mass | 0.050 g | 6.500 g |
| Mean Mass | 0.0543 | 6.5066 |
| Range | 0.0351–0.0648 | 6.4871–6.5381 |
| Number | 20 | 20 |

When this device was used to dilute one or more solutions with another, the software was designed to record the weight of the first ingredient added (the liquid requiring the smallest mass) and determine a correction factor for all other liquids dispensed. For example, if the first dispensing cycle delivered 5% too much of solution 1, then solutions 2 to n would be targeted for a 5% excess. In this way, very accurate dilutions could be accurately and precisely made using very small amounts of the initial solution.

An example of the precision which was achieved is shown in Table 2. In this study, 0.05 g of water was to be added to a test tube which was sitting on the balance. This was to be followed with 0.50 g of water and then finally, 2.0 g of water. Both the 0.5 and 2.0 g additions were corrected based on the error observed in delivering 0.05 g of water. As the results in Table 2 indicate, this is a particularly useful means of preparing a dilution with excellent precision and accuracy.

TABLE 2

Mass of Water (g) Delivered Using Correction Calculations

| Theory | Actual | Theory | Actual | Theory | Actual |
|---|---|---|---|---|---|
| 0.0500 | 0.0586 | 0.5860 | 0.5969 | 1.1720 | 1.1739 |
| 0.0500 | 0.0579 | 0.5700 | 0.5673 | 1.1580 | 1.1595 |
| 0.0500 | 0.0483 | 0.4830 | 0.4898 | 0.9660 | 0.9806 |
| 0.0500 | 0.0615 | 0.6150 | 0.6004 | 1.2300 | 1.2450 |
| 0.0500 | 0.0591 | 0.5910 | 0.5846 | 1.1820 | 1.1881 |
| 0.0500 | 0.0567 | 0.5670 | 0.5755 | 1.1340 | 1.1292 |
| 0.0500 | 0.0867 | | | | |
| 0.0500 | 0.0580 | 0.5800 | 0.5881 | 1.1600 | 1.1609 |
| 0.0500 | 0.0541 | 0.5410 | 0.5417 | 1.0820 | 1.0696 |
| 0.0500 | 0.0599 | 0.5990 | 0.5883 | 1.1980 | 1.1902 |
| 0.0500 | 0.0591 | 0.5910 | 0.5882 | 1.1820 | 1.1953 |
| 0.0500 | 0.0639 | 0.6390 | 0.6264 | 1.2780 | 1.2668 |
| 0.0500 | 0.0575 | 0.5750 | 0.5872 | 1.1500 | 1.1512 |
| 0.0500 | 0.0583 | 0.5830 | 0.5888 | 1.1660 | 1.1716 |
| 0.0500 | 0.0575 | 0.5750 | 0.5876 | 1.1500 | 1.1615 |
| 0.0500 | 0.0548 | 0.5480 | 0.5579 | 1.0960 | 1.9872 |
| 0.0500 | 0.0616 | 0.6150 | 0.6065 | 1.2300 | 1.2619 |
| 0.0500 | 0.0580 | 0.5800 | 0.5903 | 1.1600 | 1.1506 |
| 0.0500 | 0.0574 | 0.5740 | 0.5645 | 1.1480 | 1.1397 |
| 0.0500 | 0.0553 | 0.5330 | 0.5582 | 1.1060 | 1.1288 |
| 0.0500 | 0.0619 | 0.6190 | 0.6373 | 1.2380 | 1.2384 |
| Avg 0.0500 | 0.0593 | 0.5795 | 0.5813 | 1.1593 | 1.1625 |
| RSD 0 | 11.9% | 5.74% | 5.34% | 5.74% | 5.80% |

Example 2

Larger volumes were prepared using a device similar to that depicted in FIG. 1. This device consisted of a FMI QB2-CKC pump and a Mettler PM4000 balance which were under control of closed loop feedback software described herein.

The results of a study where a specific volume was dispensed into a 2 liter glass vessel are reported in Table 3.

TABLE 3

Dispensing by Weight

| Requested | 25 g | 100 g | 250 g | 500 g |
|---|---|---|---|---|
| Average | 25.04 g | 100.05 g | 250.04 g | 500.03 g |
| Max Weight | 25.08 | 100.10 | 250.10 | 500.05 |
| Min Weight | 24.99 | 100.01 | 249.99 | 499.99 |
| Std. Dev. | 0.02 | 0.02 | 0.03 | 0.01 |
| Number | 20 | 20 | 15 | 5 |

Example 3

Large quantities of solution have been dispensed using this same technique. In this example, depicted in FIG. 9, a 50 L glass vessel was suspended on a Mettler BB60-MCE2 balance in an aluminum frame. The balance was capable of weighing from 0.01 g to 60 Kg. An FMI pump, with a maximum flow rate of 300 ml/min, was used to deliver the liquid, from any of the reservoirs to the glass vessel. To demonstrate the utility, accuracy and precision of this device, five different quantities of water were each dispensed 20 times. The results of this study are reported in Table 4(a) and (b).

TABLE 4(a)

Dispensing Study at Mass Ranges 1.0 to 100 g

| Requested | 1.0 g | 10 g | 100 g |
|---|---|---|---|
| Average | 1.0360 | 10.0750 | 100.0365 |
| Std Dev. | 0.0570 | 0.0634 | 0.036 |

TABLE 4(b)

Dispensing Study at Mass Ranges 1,000 to 10,000 g

| Requested | 1,000 g | 10,000 g |
|---|---|---|
| Average | 999.9640 | 10,000.01 |
| Std Dev. | 0.0843 | 0.06 |

What is claimed is:

1. A device for the delivery of a solution comprising:
   (a) a pump for transferring the solution to a vessel at a variable rate;
   (b) means for continuously weighing the vessel and the solution transferred to the vessel;
   (c) controller means, for responding to an external request for delivery of the solution being operably associated with the means for weighing the vessel and the solution transferred to the vessel; and
   (d) proportional and integral closed loop feedback software means for calculating a signal being operably associated with the controller means, the signal being transmitted to the pump for transferring the solution to the vessel, causing the transfer of solution to the vessel to increase or decrease in rate;

wherein the controller means initiates a dispensing operation by responding to an external request for delivery of the solution by producing a second signal which is proportional to a current needed to generate a flow rate of solution, the second signal being transmitted to a pump control electronics circuit where the second signal is converted to a current which drives the pump for transferring the solution to the vessel, the magnitude of said second signal being continuously calculated by the proportional and integral closed loop feedback software means throughout the dispensing operation based on an error continuously calculated by the controller means, the error being equal to the difference between a mass of solution requested and a mass of solution delivered at any time during the dispensing operation.

2. The device of claim 1 wherein the pump for transporting the solution to a vessel are selected from the group consisting of a pressurizable reservoir and shut off valve combination, a piston pump, syringe pump, bellows pump, displacement pump, peristaltic pump, reciprocating piston pump, centrifugal or centripetal pump, rotary vane pump, impeller device, diaphragm pump and gravity feed device.

3. The device of claim 1 wherein the means for continuously weighing the vessel and the solution transferred to the vessel is selected form the group consisting of a balance, scale, load cell, pressure transducer and digital balance.

4. The device of claim 1 wherein the controller means are selected from a microcomputer, a multi-purpose computer, and a programmable logic controller.

5. The device of claim 1 wherein proportional and integral closed loop feedback software mean is a computer program which operates on the controller means.

* * * * *